United States Patent [19]

Harigaya et al.

[11] Patent Number: 5,333,015
[45] Date of Patent: Jul. 26, 1994

[54] IMAGE SIGNAL PROCESSING APPARATUS HAVING NOISE ELIMINATING AND SPECIAL EFFECT MODE

[75] Inventors: Isao Harigaya; Hisataka Hirose; Koji Takahashi, all of Yokohama, Japan

[73] Assignee: Canon Kabushiki Kaisha, Tokyo, Japan

[21] Appl. No.: 25,737

[22] Filed: Mar. 3, 1993

Related U.S. Application Data

[63] Continuation of Ser. No. 742,165, Aug. 1, 1991, abandoned, which is a continuation of Ser. No. 389,979, Aug. 7, 1989, abandoned.

[30] Foreign Application Priority Data

Oct. 31, 1988 [JP] Japan ................. 63-273356

[51] Int. Cl.$^5$ ............................................. H04N 5/21
[52] U.S. Cl. ...................................... 348/578; 348/620
[58] Field of Search ............... 358/167, 36, 22, 183, 358/160, 21 R; H04N 5/262, 5/265, 5/21, 5/213

[56] References Cited

U.S. PATENT DOCUMENTS

| | | | |
|---|---|---|---|
| 4,107,759 | 8/1978 | Rossi et al. ............................ | 358/36 |
| 4,752,826 | 6/1988 | Barnett .................................. | 358/160 |
| 4,841,366 | 6/1989 | Katagiri et al. ....................... | 358/167 |
| 4,853,765 | 8/1989 | Katsumato et al. ................... | 358/140 |

*Primary Examiner*—James J. Groody
*Assistant Examiner*—David E. Harvey
*Attorney, Agent, or Firm*—Fitzpatrick, Cella, Harper & Scinto

[57] ABSTRACT

An image signal processing apparatus according to the present invention is configured so that a new image signal is formed using an input image signal and an image signal which has previously been stored, and either one of the input image signal and the newly formed image signal is selectively stored again. It becomes thereby possible to instantaneously store the input image signal whenever necessary.

6 Claims, 2 Drawing Sheets

IMAGE SIGNAL PROCESSING APPARATUS HAVING NOISE ELIMINATING AND SPECIAL EFFECT MODE

This application is a continuation of application Ser. No. 07/742,165, filed Aug. 1, 1991 (now abandoned which is a continuation of application Ser. No. 07/389,979, filed, Aug. 7, 1989 (now abandoned).

BACKGROUND OF THE INVENTION

1. Field of the Invention

This invention relates to an image signal processing apparatus for processing image signals.

2. Description of the Prior Art

Heretofore, as an apparatus for processing image signals there has been known a digital image-signal processing apparatus which digitizes image signals, once stores the digitized signals in a field memory, and outputs the contents stored in the memory by performing proper processing. The apparatus may perform special reproductions, such as still reproduction in a video tape recorder and the like, so that noise is not generated on a display picture surface, and can be utilized in special effects, such as multiple-picture-surface displayed in which plural images are simultaneously displayed on one display picture surface, wipes, fades and the like, or can be utilized in a noise reducer, which performs signal operation over several fields to reduce a noise component, and the like. FIG. 1 shows a block diagram of a cyclic-type noise reducer as a conventional image signal processing apparatus. In FIG. 1, an image signals generated from a camera unit 2 is, for example, converted from an analog signal into a digital signal by an analog-to-digital (A/D) converter 3. The digital image signal is multiplied by a coefficient $(1-K)$ at a coefficient multiplier 12 within a processing circuit 14, and is supplied to a field memory 6, which will be described later, via an adder 13. The signal read from the field memory 6 is multiplied by a coefficient K at a coefficient multiplier 11, added at the adder 13 to the signal which has been multiplied by $(1-K)$ at the coefficient multiplier 12, and the resultant signal is output, the circuitry thus constituting a cyclic loop.

A digital-to-analog (D/A) converter 10 converts the digital image signal output from the adder 13 into an analog image signal and outputs the analog signal at 8. A synchronizing-signal separation circuit 4 separates a synchronizing signal added to the image signal. A memory controller 5 controls conversion operations in the A/D converter 3 and the D/A converter 10 in accordance with the synchronizing signal separated at the synchronizing-signal separation circuit 4, and assigns a write address or a read address in the field memory 6 for the digital image signal output from the adder 13. The field memory 6 stores digital image signals in units of a field. An operation unit 9 assigns various kinds of modes, such as noise reducer processing, wipe processing, fade processing and the like. A coefficient generator 7 supplies the coefficient multipliers 11 and 12 with the coefficient K complying with the mode assigned by the operation unit 9, and sets the values of the coefficients $1-K$ and $K$.

In FIG. 1, an image signal including a noise component which is generated from the camera unit 2 is digitized at the A/D converter 3, and then multiplied by $(1-K)$ at the multiplier 12, and stored in the field memory 6 via the adder 13. The signal read from the field memory 6 is multiplied by K at the multiplier 11, supplied to the adder 13, and added to the signal multiplied by $(1-K)$ at the coefficient multiplier 12. Thus, only a random noise component which is randomly generated for every field period in an image signal is suppressed.

Now, in the above-described circuit configuration, when performing wipe or fade operation of a still-picture image and a moving-picture image, it is necessary to store image signals obtained from the camera unit 2 in the field memory 6. When writing image signals output from the camera unit 2 in the field memory 6, input is performed via the processing circuit 14. Hence, after initial setting of the value of the coefficient K at the coefficient multipliers 11 and 12 has once been performed and storage in the field memory 6 has been completed, the value of the coefficient K to be used by the coefficient multipliers 11 and 12 is set by the coefficient generator 7 in accordance with the mode assigned by the operation unit 9, and a period for setting the value of the coefficient K is therefore required. Accordingly, storage operation of image signals obtained by the camera unit 2 in the field memory 6 is delayed by the time needed for performing the initial setting of the value of the coefficient K, and the image signals can not be instantaneously stored in the field memory.

SUMMARY OF THE INVENTION

It is an object of the present invention to provide an image signal processing apparatus which can solve the above-described problems.

It is another object of the present invention to provide an image signal processing apparatus which can instantaneously store input image signals whenever necessary with a simple configuration.

These and other objects are accomplished, according to one aspect of the present invention, by an image signal processing apparatus for processing image signals comprising storage means for storing image signals, image signal processing means for inputting a first image signal and a second image signal output from the storage means, for forming a third image signal using the input first image signal and second image signal, and outputting the third image signal, and supply means for supplying the storage means with either the first or the third image signal output from the image signal processing means.

These and other objects, features and advantages of present invention will become more apparent from the following detailed description of the preferred embodiment, taken with reference to the accompanying drawings.

DESCRIPTION OF THE PREFERRED EMBODIMENT

The present invention will be hereinafter explained with reference to an embodiment of the invention.

Figure 1:
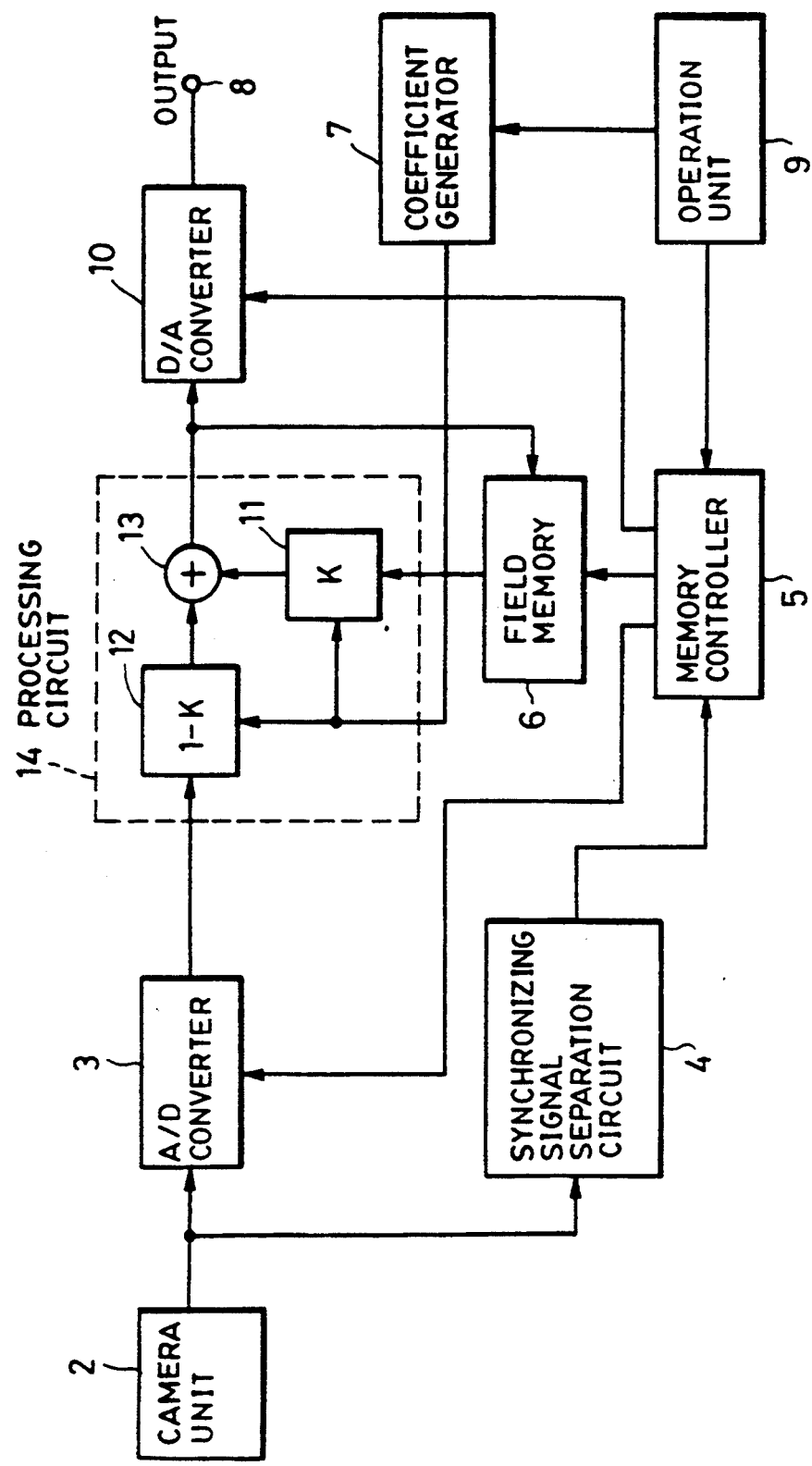
FIG. 1 is a block diagram showing the schematic configuration of a conventional image signal processing apparatus.
Figure 2:
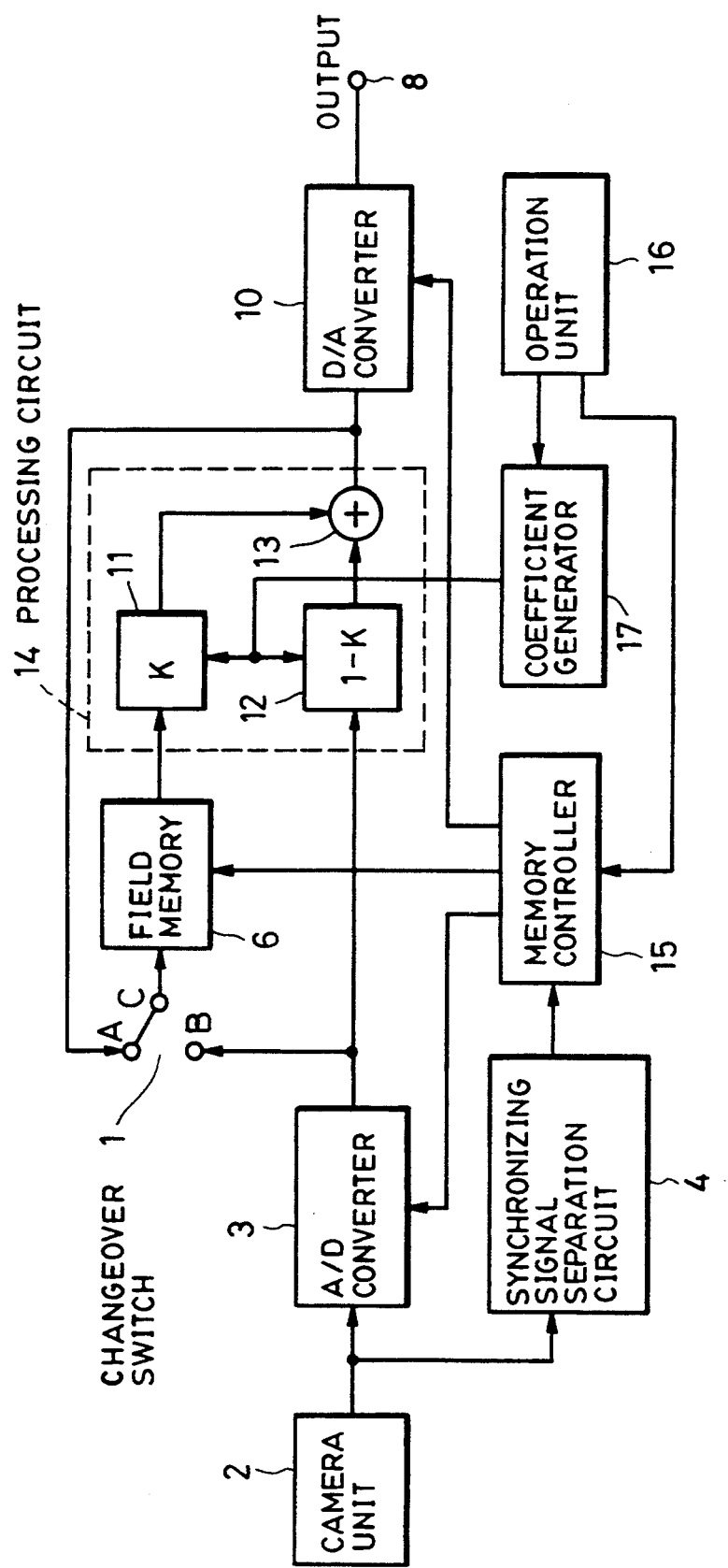
FIG. 2 is a block diagram showing the schematic configuration of an image signal processing apparatus constructed in accordance with the present invention.

FIG. 2 is a block diagram showing the schematic configuration of an image signal processing apparatus as an embodiment of the present invention. In FIG. 2, a changeover switch 1 outputs a signal by switching between a digital image signal output from an A/D converter 3 and a digital image signal output from a processing circuit 14, and supplies a field memory 6 with the signal so selected. A memory controller 15 assigns a write address or a read address of a digital image signal in the field memory 6. An operation unit 16 assigns various kinds of modes, such as noise reducer processing, wipe processing, fade processing and the like. A coefficient generator 17 sets the value of the coefficient K corresponding to the mode assigned by the operation unit 16. In FIG. 2, like components as those in FIG. 1 are indicated by like numerals, and a detailed explanation thereof will be omitted.

In the configuration shown in FIG. 2, by connecting the changeover switch 1 to side A, a configuration identical to that in FIG. 1 is provided, and a noise reducer function for reducing a random noise component in an image signal can be obtained.

By connecting the changeover switch 1 to side B, the digital image signal output from the A/D converter 3 is directly supplied to the field memory 6 via the changeover switch 1. By this operation, still-picture image signals for one field are stored in the field memory 6. By multiplying the still-picture image signals stored in the field memory 6 and moving-picture image signals output from the A/D converter 3 by the coefficient K and (1−K) at the coefficient multipliers 11 and 12 of the processing circuit 14, respectively, then adding them at the adder 13, and outputting the resultant signals, signals resulting from wipe or fade processing of the still-picture image signals and the moving-picture image signals are output from an output terminal 8. The processing circuit 14 thus delays an input signals briefly.

As explained above, in the present embodiment, digital image signals output from the camera unit 2 and digitized by the A/D converter 3 and digital image signals output from the adder 13 are switched by the changeover switch 1 and supplied to the field memory. Hence, when performing wipe processing or fade processing, digital image signals can be directly supplied to the field memory without first passing through the coefficient multiplier by switching the change-over switch 1 to the output side of the A/D converter 3 (position B). Accordingly, when storing digital image signals output from the camera unit 2 and digitized by the A/D converter 3 in the field memory 6, preceding processing, such as initial-value setting of the value of the coefficient K at the coefficient multipliers 11 and 12 and the like, becomes unnecessary, and it is not necessary to provide a circuit for setting the initial value of the coefficient K. It is therefore possible to simplify the configuration.

What is claimed is:

1. An image signal processing apparatus for processing image signals comprising:

(A) storage means for storing image signals;

(B) image signal processing means for receiving an input first image signal and a second image signal output from said storage means, forming a third image signal by using the input first image signal and the second image signal, and outputting the third image signal;

(C) operation mode selecting means, having a first operation mode to execute a noise eliminating process for eliminating a noise element of the first image signal and a second operation mode to execute an image process for a special effect on the first image signal, for selecting either one of the two modes; and (D) image signal supply means, to which the first image signal and the third image signal output from said image signal processing means are input for supplying the third image signal output from said image signal processing means to said storage means when the first operation mode is selected in said operation mode selecting means or the first image signal to said storage means when the second operation mode is selected in said operation mode selecting means.

2. An image signal processing apparatus according to claim 1, wherein said image signal processing means includes:

(A) first-coefficient-multiplying means for receiving the first image signal, multiplying the first image signal by a first coefficient, and outputting the resultant signal;

(B) second-coefficient-multiplying means for receiving the second image signal output from said storage means, multiplying the second image signal by a second coefficient different from said first coefficient, and outputting the resultant signal; and (C) addition means for adding the output of said first-coeffecient-multiplying means and the output of said second-coefficient-multiplying means and outputting the resultant signal as the third image signal.

3. An image signal processing apparatus according to claim 1, wherein said image signals include television signals, and said storage means is arranged so as to store television signals for one field.

4. An image signal processing apparatus for processing image signals comprising:

(A) delay means for delaying image signals for a predetermined period;

(B) image signal processing means for receiving an input first image signal and a second image signal delayed for the predetermined period by said delay means, forming a third image signal by using the input first image signal and the second image signal, and outputting the third image signal;

(C) operation mode selecting means, having a first operation mode to execute a noise eliminating process for eliminating a noise element of the first image signal and a second operation mode to execute an image process for a special effect on the first image signal, for selecting either one of the two modes; and (D) image signal supply means, to which the first image signal and the third image signal output from said image signal processing means are input for supplying the third image signal output from said image signal processing means to said delay means when the first operation mode is selected in said operation mode selecting means or the first image signal to said delay means when the second operation mode is selected in said operation mode selecting, means.

5. An image signal processing apparatus according to claim 4, wherein said image signal processing means includes:

(A) first-coefficient-multiplying means for receiving the first image signal, multiplying the first image signals by a first coefficient, and outputting the resultant signal;

(B) second-coefficient-multiplying means for receiving the second image signal output from said delay means, multiplying the second image signal by a second coefficient different from said first coefficient, and outputting the resultant signal; and (C) addition means for adding the output of said first-coeffecient-multiplying means and the output of said second-coefficient-multiplying means and outputting the resultant signal as the third image signal.

6. An image signal processing apparatus according to claim 4, wherein said image signals include television signals, and said delay means is arranged so as to store television signals for one field.

* * * * *

UNITED STATES PATENT AND TRADEMARK OFFICE
CERTIFICATE OF CORRECTION

PATENT NO.  : 5,333,015
DATED       : July 26, 1994
INVENTOR(S) : ISAO HARIGAYA ET AL.

It is certified that error appears in the above-identified patent and that said Letters Patent is hereby corrected as shown below:

COLUMN 1

Line 7, "abandoned" should read --abandoned),--.
Line 9, "filed," should read --filed--.
Line 26, "displayed" should read --display--.
Line 33, "signals" should read --signal--.

COLUMN 3

Line 33, "signals" should read --signal--.

COLUMN 4

Line 26, "coeffecient-multiplying" should read --coefficient-multiplying--.
Line 61, "ing," should read --ing--.

UNITED STATES PATENT AND TRADEMARK OFFICE
CERTIFICATE OF CORRECTION

PATENT NO. : 5,333,015
DATED : July 26, 1994
INVENTOR(S) : ISAO HARIGAYA ET AL.

Page 2 of 2

It is certified that error appears in the above-identified patent and that said Letters Patent is hereby corrected as shown below:

COLUMN 5

Line 7, "coeffecient-multiplying" should read --coefficient-multiplying--.

Signed and Sealed this

Twenty-first Day of February, 1995

Attest:

BRUCE LEHMAN

Attesting Officer

Commissioner of Patents and Trademarks